April 1, 1952     G. MONETTE     2,591,582
WELDING TRANSFORMER
Filed Jan. 31, 1948     2 SHEETS—SHEET 1
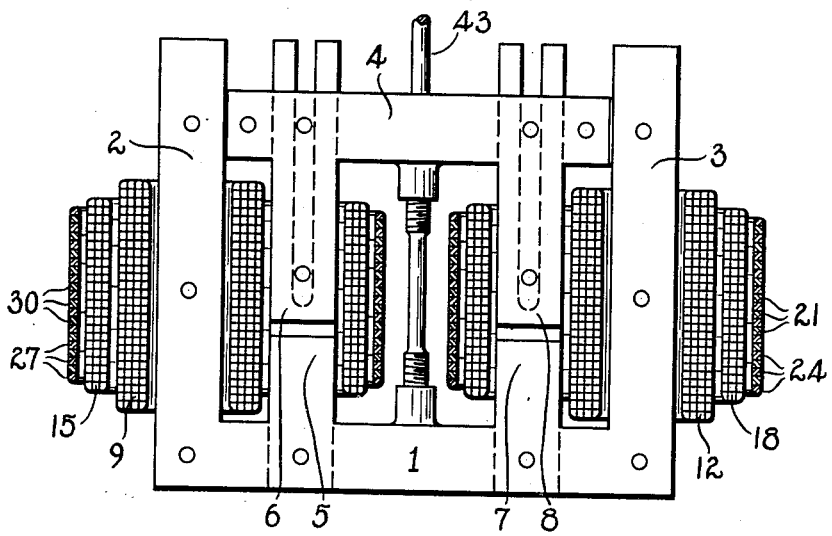

April 1, 1952  G. MONETTE  2,591,582
WELDING TRANSFORMER
Filed Jan. 31, 1948  2 SHEETS—SHEET 2
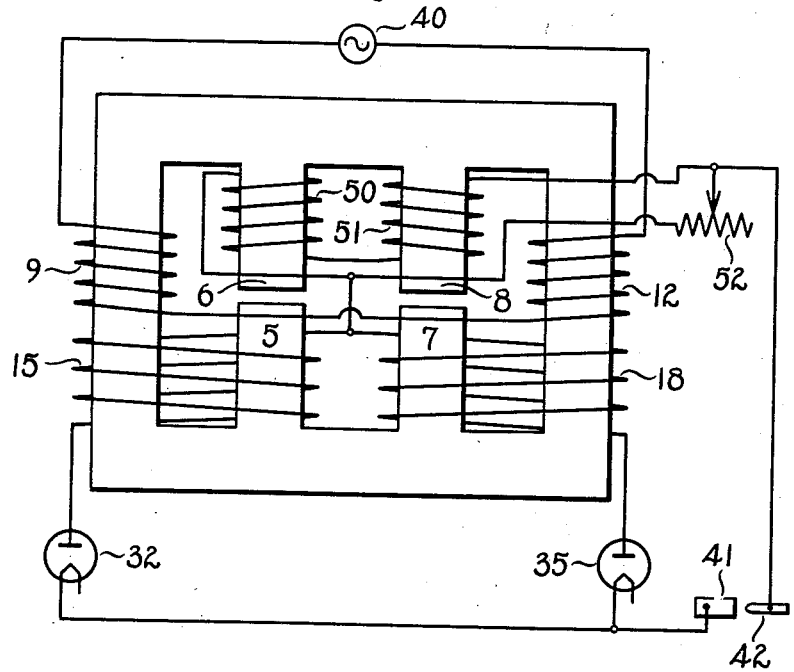
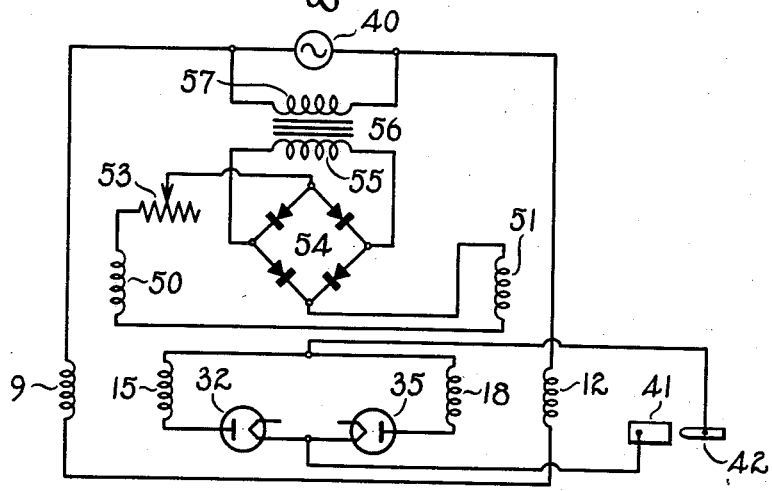

Patented Apr. 1, 1952

2,591,582

UNITED STATES PATENT OFFICE 2,591,582

WELDING TRANSFORMER

Gib Monette, Chicago, Ill., assignor to Atomiko, Inc., Chicago, Ill., a corporation of Illinois Application January 31, 1948, Serial No. 5,531

11 Claims. (Cl. 321—27)

The invention relates to transformers and while suitable for other purposes is particularly applicable to welding apparatus capable of supplying from an alternating current source selectively direct or alternating current for a welding arc.

The patents to Fries Nos. 2,411,370, dated November 19, 1946, and 2,437,021, dated March 2, 1948, disclose welding transformers for the control of alternating welding current from an alternating source of energy. The present invention relates to apparatus and a system which in certain aspects is an improvement of said disclosures and which affords a supply of alternating or unidirectional welding current energy as may be desired, from an alternating current source.

It is a well known fact that the welding arc whether it be alternating or direct current has a drooping voltage characteristic, that is, the arc voltage decreases with increasing welding current. The aforementioned patents relate to transformers which afford such drooping voltage characteristics for alternating welding current.

The present invention has for its object to provide a system including a transformer of the aforementioned type which affords direct current welding energy derived from an alternating current source.

Another object is to provide welding apparatus which may be used for supplying either direct or alternating welding current selectively.

Another object is to provide a welding current supply system including a welding transformer affording the most suitable arc voltage for either direct or alternating current welding, respectively.

Another object is to provide a welding current supply system which includes a welding transformer provided with simple selective means for adapting it to supply direct current or, alternatively, alternating current welding energy from an alternating current source of energy supply.

Another object is to provide apparatus in which the welding current whether it is direct or alternating current can be readily adjusted.

Other objects and advantages will hereinafter appear.

The accompanying drawing is illustrative of an embodiment of the invention. In the drawing, Fig. 1 is a vertical section through a transformer embodying the invention, Fig. 2 is a diagram of the transformer of Fig. 1, when connected for the supply of alternating welding current, Fig. 3 is a diagram of connections of the apparatus when connected for supplying direct current for welding, Fig. 4 is a modification of my invention in which the direct current arc voltage is controlled by superposing a unidirectional saturating flux which is induced by the arc current upon the alternating secondary flux, while Fig. 5 is still another modification of connections affording rectified welding current.

Referring to Figs. 1 and 2, the former illustrates a transformer structure which may be employed in carrying out the invention, and the latter illustrates the connections for obtaining alternating welding current. The transformer has a laminated stationary core 1, provided with side members 2 and 3 and a movable core member 4, which completes the magnetic circuit between the members 2 and 3. Intermediate its ends the member 4 is provided with downwardly extending polar extensions 6 and 8, which are in line with similar upward extensions 5 and 7 on the core 1. Upon vertical reciprocation of the member 4 by rotation of a screw 43 having right and left hand threads, the air gaps between the polar extensions 5, 6, 7, and 8, are varied so as to vary the reluctance of the magnetic path including said extensions.

Mounted on the legs 2 and 3 are the primary coils 9 and 12, respectively. The coil 9 has end terminals 10 and 11 and the coil 12 has end terminals 13 and 14. The terminals 10 and 14 are jointly connected to one and the terminals 11 and 13 are jointly connected to the other terminal of an alternating current source of current 40. A secondary winding 15 is mounted outside of the primary winding 9, but so arranged that in addition to primary winding 9, it also surrounds the side member 2 and the polar extensions 5 and 6. A similar secondary winding 18 surrounds the primary winding 12 and the polar extensions 7 and 8. There are further provided the tertiary windings 21, 24, 27 and 30, which are wound on the outside of the secondary windings, but these latter windings are not shown in Fig. 2, as they are not in circuit when the apparatus operates to supply alternating current welding energy.

Secondary winding 15 has end terminals 16 and 17, and secondary winding 18 has end terminals 19 and 20. For alternating current operation the windings 15 and 18 are connected in parallel with each other across a welding arc between a workpiece 41 and a welding electrode 42. The apparatus then operates in the manner fully explained in the aforementioned patents and the alternating welding current may be regulated by varying the air gaps between the aforementioned polar extensions through operation of the screw 43, as fully explained in the aforementioned patents.

The primary coils and/or the secondary coils may be connected in series (not shown) instead of in parallel to adapt the transformer for a primary voltage which is higher or lower than that assumed for the connections shown.

Referring to Figs. 1 and 3, the latter shows the primary coils 9 and 12 connected in parallel to the source of alternating current as in Fig. 2. However, the secondary coils 15 and 18 are connected in series with each other. The two pairs of tertiary coils 21—24 and 27—30, are now connected in circuit to afford the required output voltage for direct current operation. One of the terminals of each of a pair of tertiary coils is connected to the free terminal of the respective adjacent secondary coil, while the other terminal of each tertiary coil is connected to one of the anodes of the electron tubes 32 to 35, inclusive, respectively. Suitable individual inductor coils 36 to 39, inclusive, may be connected in series with said tertiary coils and said tubes as indicated. The tubes are preferably of the gaseous conduction type. The cathodes of the tubes 32 to 35, inclusive, are connected in parallel to the workpiece 41, while the terminals 17 and 19 of the windings 15 and 18, respectively, are jointly connected to the welding electrode 42.

When power is supplied to the primary windings 9 and 12, a voltage is induced in the respective secondary and tertiary windings, the polarities being such that the voltages in the coils 18, 21, 24 and 15, 27, 30, respectively, are substantially in phase with each other, while the voltages induced in the two groups are displaced one half cycle from each other. Hence during one half cycle of the alternating voltage, current passes from the workpiece through the tube 32 and coil 30 and through the tube 33 and coil 27, then jointly through coil 15 to the electrode 42. During the succeeding half cycle current passes through tube 34 and coil 21 and through tube 35 and coil 24 and jointly through coil 18 to the welding electrode. If the current required is low, one of each pair of inductor coils 36, 37 and 38, 39, may be omitted, or a greater number of tubes and corresponding tertiary coils may be employed for relatively high welding current. Under certain conditions it may also not be necessary to employ the inductors 36 to 39, inclusive. It is also possible to divide the secondary coils 15 and 18, respectively, into two parallel connected sections and connect each section in series with one of the respective tertiary coils.

Under certain conditions the separate secondary coils 15 and 18, may be omitted, in which case the terminals 22, 25, 39 and 32, are jointly connected through the inductor 44 to the electrode 42. It is of course understood that in such event the coils 21, 24, 27, and 30, are provided with a number of turns to afford the required secondary voltage.

Suitable means (not shown) will have to be provided for energizing the cathodes of the tubes 32 to 35, inclusive. Also switching means may be provided for commutating all circuits simultaneously when changing from one mode of operation to another as will be apparent to one skilled in the art.

Referring to Fig. 4, the same illustrates a modification of the systems shown in Figs. 1 to 3, inclusive. In the systems explained so far, the ratio between the open circuit input and output voltages was adjusted by adjustment of the air gap between the polar extensions 5, 6, and 7, 8, respectively. In the construction Fig. 4, the air gap between the polar extensions may be fixed, while the reluctance of the secondary flux path is varied by saturating coils 50 and 51 mounted inductively on said polar extensions. The primary coils 9 and 12 are connected in series, as shown, across the alternating current supply source 40. The secondary coils 15 and 18 have one of their terminals in common, while their second terminals are connected through the rectifiers 32 and 35, respectively, to the workpiece 41. The aforementioned saturating coils are connected in series with each other between said common terminal and the welding electrode 42. It is obvious that now the arc is supplied with unidirectional current, while the variable direct current flux induced by the saturating winding increases the reluctance of the polar extensions for the secondary alternating flux through said extensions, the increase being a function of the welding current. Hence the secondary leakage flux decreases with the result that the ratio between the primary and the secondary terminal voltages increases. The coils 50 and 51 may be provided with a plurality of taps (not shown), so that the number of turns in series with the arc current may be varied for varying the voltage-current characteristic of the output circuit. It is further possible to parallel the coils 50 and 51 with a fixed or adjustable resistor 52, so that only a part of the welding current flows through the coils. If desired a smoothing capacitor (not shown) may be connected in shunt with the coils 50 and 51 to smooth out the ripples of the current due to variations of the flux interlinked with said coils and finally the coils 50 51, or an equivalent coil or coils may be mounted on the upper or lower or both horizontal sections of the frame 1 and/or yoke 4, which are intermediate between the respective polar extensions.

Fig. 5 shows still another modification for connecting the system so as to supply rectified welding current from an alternating current source of energy. In the system of Fig. 5, the primary coils 9 and 12 are shown connected in series across the alternating current source of energy 40. The secondary coils 15 and 18 have one of their respective terminals jointly connected to the welding electrode 42, while between the other terminals and the workpiece are connected the rectifiers 32 and 35. The secondary or welding circuit may be provided with a plurality of parallel connected rectifying tubes and also with smoothing impedances as shown and explained in connection with Fig. 3. The system is further provided with the saturating coils 50 and 51, which are connected in series with each other and with an adjustable resistor 53 to the output terminals of a full wave rectifier 54. The input terminals of the rectifier are connected to the secondary winding 55 of a transformer 56, the primary winding 57 of which is connected across the terminals of the alternating current source 40. By adjustment of the resistor 53, the current in the saturating windings 50 and 51 may be varied, thus affording variation of the output current of the device similar to that afforded by windings 50 and 51 of Fig. 4.

Obviously the saturating windings 50 and 51 may be energized from a direct current source, whereby the windings 50 and 51 are connected in series with the regulating resistor 53 across the direct current source.

Other obvious modifications within the scope of the present disclosure and the appended claims will suggest themselves to those skilled in the art.

What I claim as new and desire to secure by Letters Patent is:

1. In a welding transformer and the like, a closed primary magnetic core and including a plurality of legs joined by a plurality of yokes, a primary winding encircling a leg of said core, and adapted to be energized by an alternating current, a secondary winding of substantially rectangular transverse cross section telescoped over said primary winding, said secondary winding having one side of its inner circumferential wall spaced a substantial distance from the outer circumferential wall of said primary winding, a secondary magnetic core extending from the yokes of said primary core and arranged to pass axially through the space between said walls of the primary and secondary windings so as to be inductively interlinked with said secondary winding only, said secondary core comprising two parts and an air gap interposed therebetween in the path of the flux induced by said secondary winding, a tertiary winding connected in series with said secondary winding and inductively interlinked with said secondary core, and rectifying means in circuit with said tertiary winding.

2. In a welding transformer and the like, a first pair of legs and a first yoke to form therewith a unitary substantially U-shaped primary magnetic core, a second pair of legs and a second yoke to form therewith a unitary substantially U-shaped secondary magnetic core coplanar with and inverted relative to said primary core, said second yoke being located and arranged to provide a magnetic bridge between the open ends of said primary core, said first yoke providing a magnetic bridge including a pair of air gaps between the open ends of said secondary core, a pair of primary windings each encircling one each of said first pair of legs and adapted to be energized from an alternating current source, a pair of secondary windings, each secondary winding encircling one each of said first pair of legs and the corresponding one of said second pair of legs and having its inner circumferential wall spaced from the outer circumferential wall of the respective primary winding to afford passage therethrough of the respective leg of said secondary pair of legs, a saturating winding inductively interlinked with said secondary core, means to energize said saturating winding; and rectifying means in circuit with said saturating winding.

3. In a welding transformer and the like, an alternating current source, a closed primary magnetic core and including a plurality of legs joined by a plurality of yokes, a primary winding encircling a leg of said core and adapted to be energized by current from said cource, a secondary winding of substantially rectangular transverse cross section telescoped over said primary winding, said secondary winding having one side of its inner circumferential wall spaced a substantial distance from the outer circumferential wall of said primary winding, a secondary magnetic core extending from the yokes of said primary core and arranged to pass axially through the space between said walls of the primary and secondary windings so as to be inductively interlinked with said secondary winding only, said secondary core comprising two parts and an air gap interposed therebetween in the path of the flux induced by said secondary winding, a tertiary winding connected in series with said secondary winding and interlinked with said secondary core, rectifying means in circuit with said tertiary windings, and means to energize said tertiary winding by energy derived from said source.

4. In a welding transformer and the like, a first pair of legs and a first yoke to form therewith a unitary substantially U-shaped primary magnetic core, a second pair of legs and a second yoke to form therewith a unitary substantially U-shaped secondary magnetic core coplanar with and inverted relative to said primary core, said second yoke being located and arranged to provide a magnetic bridge between the open ends of said primary core, said first yoke providing a magnetic bridge including a pair of air gaps between the open ends of said secondary core, a pair of primary windings each encircling one each of said first pair of legs and adapted to be energized from an alternating current source, a pair of secondary windings, each secondary winding encircling one each of said first pair of legs and the corresponding one of said second pair of legs and having its inner circumferential wall spaced from the outer circumferential wall of the respective primary winding to afford passage therethrough of the respective leg of said secondary pair of legs, a saturating winding inductively interlinked with said secondary core, rectifying means in circuit with said saturating winding, and means to energize said saturating winding by energy derived from said source.

5. In a welding transformer and the like, an alternating current source, a closed primary magnetic core and including a plurality of legs joined by a plurality of yokes, a primary winding encircling a leg of said core and adapted to be energized by current from said source, a secondary winding of substantially rectangular transverse cross section telescoped over said primary winding, said secondary winding having one side of its inner circumferential wall spaced a substantial distance from the outer circumferential wall of said primary winding, a secondary magnetic core extending from the yokes of said primary core and arranged to pass axially through the space between said walls of the primary and secondary windings so as to be inductively interlinked with said secondary winding only, said secondary core comprising two parts and an air gap interposed therebetween in the path of the flux induced by said secondary winding, a tertiary winding interlinked with said secondary core and connected in series with said secondary winding, and rectifying means in circuit with said secondary and said tertiary winding.

6. In a welding transformer and the like, a first pair of legs and a first yoke to form therewith a unitary substantially U-shaped primary magnetic core, a second pair of legs and a second yoke to form therewith a unitary substantially U-shaped secondary magnetic core coplanar with and inverted relative to said primary core, said second yoke being located and arranged to provide a magnetic bridge between the open ends of said primary core, said first yoke providing a magnetic bridge including a pair of air gaps between the open ends of said secondary core, a pair of primary windings each encircling one each of said first pair of legs and adapted to be energized by an alternating current, a pair of secondary windings, each secondary winding encircling one each of said first pair of legs and the corresponding one of said second pair of legs and having its inner circumferential wall spaced from the outer circumferential wall of the respective primary winding to afford passage therethrough of the respective leg of said secondary pair of legs, a tertiary winding inductively interlinked with said secondary core and connected in series with said secondary winding, and rectifying means in circuit with said tertiary winding.

7. In a welding transformer and the like, an alternating current source, a closed primary magnetic core and including a plurality of legs joined by a plurality of yokes, a primary winding encircling a leg of said core and adapted to be energized by current from said source, a secondary winding of substantially rectangular transverse cross section telescoped over said primary winding, said secondary winding having one side of its inner circumferential wall spaced a substantial distance from the outer circumferential wall of said primary winding, a secondary magnetic core extending from the yokes of said primary core and arranged to pass axially through the space between said walls of the primary and secondary windings so as to be inductively interlinked with said secondary winding only, said secondary core comprising two parts and an air gap interposed therebetween in the path of the flux induced by said secondary winding, a tertiary winding interlinked with said secondary core and connected in series with said secondary winding, and rectifying means in circuit with said secondary and said tertiary winding, and an adjustable impedance in parallel with said tertiary winding.

8. In a welding transformer and the like, a first pair of legs and a first yoke to form therewith a unitary substantially U-shaped primary magnetic core, a second pair of legs and a second yoke to form therewith a unitary substantially U-shaped secondary magnetic core coplanar with and inverted relative to said primary core, said second yoke being located and arranged to provide a magnetic bridge between the open ends of said primary core, said first yoke providing a magnetic bridge including a pair of air gaps between the open ends of said secondary core, a pair of primary windings each encircling one each of said first pair of legs and adapted to be energized by an alternating current, a pair of secondary windings, each secondary winding encircling one each of said first pair of legs and the corresponding one of said second pair of legs and having its inner circumferential wall spaced from the outer circumferential wall of the respective primary winding to afford passage therethrough of the respective leg of said secondary pair of legs, a saturating winding inductively interlinked with said secondary core and connected in series with said secondary winding, rectifying means in circuit with said saturating winding, and an adjustable impedance in parallel with said saturating winding.

9. In a welding transformer and the like, a first pair of legs and a first yoke to form therewith a unitary substantially U-shaped primary magnetic core, a second pair of legs and a second yoke to form therewith a unitary substantially U-shaped secondary magnetic core coplanar with and inverted relative to said primary core, an intermediate portion of said secondary core being located and arranged to provide a magnetic bridge between the open ends of said primary core, an intermediate portion of said primary core providing a magnetic bridge including a pair of air gaps between the open ends of said secondary core, a pair of primary windings each encircling one each of said first pair of legs and adapted to be energized by an alternating current, a pair of secondary windings, each secondary winding encircling one each of said first pair of legs and the corresponding one of said second pair of legs and having its inner circumferential wall spaced from the outer circumferential wall of the respective primary winding to afford passage therethrough of the respective leg of said secondary pair of legs, a saturating winding encircling said secondary core and connected in series with said secondary winding, means to supply said saturating winding with a unidirectional current, and an adjustable impedance in parallel with said saturating winding.

10. In a welding transformer and the like, a first pair of legs and a first yoke to form therewith a unitary substantially U-shaped primary magnetic core, a second pair of legs and a second yoke to form therewith a unitary substantially U-shaped secondary magnetic core coplanar with and inverted relative to said primary core, an intermediate portion of said secondary core being located and arranged to provide a magnetic bridge between the open ends of said primary core, an intermediate portion of said primary core providing a magnetic bridge including a pair of air gaps between the open ends of said secondary core, a pair of primary windings each encircling one each of said first pair of legs and adapted to be energized by an alternating current, a pair of secondary windings, each secondary winding encircling one each of said first pair of legs and the corresponding one of said second pair of legs and having its inner circumferential wall spaced from the outer circumferential wall of the respective primary winding to afford passage therethrough of the respective leg of said secondary pair of legs, a saturating winding inductively interlinked with said secondary core and connected in series with said secondary winding, rectifying means in circuit with said secondary and said saturating winding, and an adjustable impedance in parallel with said saturating winding.

11. In a welding transformer and the like, a closed primary magnetic core and including a plurality of legs joined by a plurality of yokes, a primary winding encircling a leg of said core and adapted to be energized by an alternating current, a secondary winding of substantially rectangular transverse cross section telescoped over said primary winding, said secondary winding having one side of its inner circumferential wall spaced a substantial distance from the outer circumferential wall of said primary winding, a secondary magnetic core extending from the yokes of said primary core and arranged to pass axially through the space between said walls of the primary and secondary windings so as to be inductively interlinked with said secondary winding only, said secondary core comprising two parts and an air gap interposed therebetween in the path of the flux induced by said secondary winding, a tertiary winding inductively interlinked with said secondary core and connected in series with said secondary winding, and rectifying means in circuit with said secondary and tertiary windings.

GIB MONETTE.

REFERENCES CITED

The following references are of record in the file of this patent:

UNITED STATES PATENTS

| Number | Name | Date |
| --- | --- | --- |
| 1,599,570 | Lucas | Sept. 14, 1926 |
| 2,437,021 | Fries | Mar. 2, 1948 |